United States Patent Office 2,952,523
Patented Sept. 13, 1960

2,952,523

MANUFACTURE OF METAL CARBONYLS

Harold E. Podall, Baton Rouge, La., assignor to Ethyl Corporation, New York, N.Y., a corporation of Delaware No Drawing. Filed Dec. 29, 1958, Ser. No. 783,212

6 Claims. (Cl. 23—203)

This invention relates to metal carbonyls and particularly the manufacture of molybdenum and tungsten hexacarbonyls.

Some procedures for the preparation of certain metal carbonyls have been described in the literature. With particular metals, successful results are obtained by reacting the metal with carbon monoxide at high temperatures and pressures or in certain instances reacting particular metal salts with hydrogen and then carbon monoxide. These procedures are applicable only in limited instances as, for example, with the metals nickel and iron. They likewise leave much to be desired since stringent process techniques are required and the metal or metal compound must be in particular form.

The procedures likewise are not available to the more difficultly produced metal carbonyls. One of the most satisfactory procedures devised as yet for the preparation of molybdenum hexacarbonyl, for example, involves the reaction of molybdenum salts with a metal, such as aluminum in the presence of carbon monoxide. For some unexplained reason the process is relatively independent of variables such as pressure beyond a certain point. In other words, essentially no change is obtained in the rate of reaction or the yield when these variables are changed. Another inherent disadvantage in the process is that the yields are so low that commercial employment of the procedure is not practical. A still further disadvantage of this process is that, during the course of reaction, by-product metallic chromium is obtained and this material cannot be converted to the desired carbonyl compound.

Accordingly, it is an object of this invention to provide a new and novel process for the preparation of molybdenum and tungsten carbonyls. A particular object is to provide a procedure whereby these hexacarbonyls are obtained in higher yield than heretofore available. Other objects and advantages will be apparent from the following description and appended claims.

The above and other objects of this invention are achieved by reacting a salt of molybdenum or tungsten including oxides or sulfides, carbon monoxide and a reducing metal of groups I–A, II and III–A, in the presence of catalytic quantities of an organometallic compound of said reducing metals. Best results are obtained using from about 0.1–30 mole percent of the organometallic compound, based on the moles of reducing metal employed. Further particular advantage is achieved when the organometallic compound is a compound of aluminum. Thus, one embodiment comprises the reaction of a salt, especially halides and salts of organic acids of molybdenum or tungsten with a group I–A, II or III–A metal in the presence of an organoaluminum compound, particularly alkyl aluminum compounds, and carbon monoxide.

When employing the procedure of this invention, simultaneous reaction of the metal salt, the reducing metal, the organometallic compound and the carbon monoxide is obtained thus providing an enhancement in yield, faster reaction rates and minimization of undesirable by-product molybdenum or tungsten metal. The stringent processing operations of the prior art techniques are not required and the difficulty of producing by-product metal is overcome. Of particular importance, the use of catalytic quantities of the organometallic compounds reduces appreciably the quantity of reducing metal required and, at the same time, increases, usually from 2 to 10 times, the conversion of the metal salt to the desired metal hexacarbonyl.

The salts of molybdenum and tungsten employable are many and varied, including both inorganic and organic salts. For the purposes herein, the oxides and sulfides of these metals are also intended in the terminology "salts" although such are not truly salts. Typical examples of the inorganic salts are the halides, phosphates, sulfites, sulfates, nitrates, fluosilicates, carbonates, oxides, sulfides, and the like. The organic salts of molybdenum and tungsten include, for example, the carboxylates, e.g. alkyl, aryl, cycloalkyl, and the like carboxylates, the alcoholates, e.g. phenates, alkoxides, and enolates and the thio-alcoholates or mercaptides. Among the inorganic salts employable in the process of this invention are molybdenum and tungsten bromide, iodide, fluoride and chloride, carbonate, the various oxides, phosphate, fluosilicate, sulfate, sulfide, sulfite, and the like. Among the organic salts of molybdenum and tungsten employable are included for example, molybdenum and tungsten acetate, benzoate, citrate, formate, lactate, oxalate, malonate, valerate, naphthenate, oleate, acetylacetonate, toluate, phenate, ethylate, decanoate, thiomethylate, and the like. It is to be understood that all valence states of the metals are intended. In general, in the organic type salts, the organo portion will contain between 1 to 25 carbon atoms in each radical although higher molecular weight acid salts can be employed.

For best results the halide salts and organic acid salts of molybdenum and tungsten are especially preferred. In those instances wherein the metal salt is a solid in the reaction mixture, it is generally desirable to employ such materials in finely divided form of the order of about 1,000 microns or less.

The reducing metal employed in the process of this invention can be any of the metals, or mixtures thereof, of groups I–A, II and III–A of the periodic chart of the elements (Handbook of Chemistry and Physics, 36th edition, pages 392–393, Chem. Rubber Publishing Co.). For economic reasons, the preferred reducing metals are sodium, magnesium, aluminum and zinc. Other suitable metals are lithium, potassium, beryllium, calcium, boron, gallium, cadmium, mercury and the other metals of these groups. These metals are usually employed in finely divided form, and frequently, particularly with metals such as sodium, are used in a dispersion in an inert diluent.

The organometallic catalyst employed is one of an element of groups I–A, II and III–A of the periodic table. Such elements include boron, aluminum, gallium, indium and thallium, discussed immediately above. The organometallic compound will usually contain alkyl and/or aryl groups having between about 1 to 25 carbon atoms in each organic radical. In general, the metal is attached to at least one carbon atom of an organic radical. The polyvalent metals can additionally be attached to other elements, as for example, the halides, hydrogen or another metal, particularly the group I–A metals. Typical examples of such organometallic compounds include the following: methyl sodium, ethyl sodium, phenyl sodium, naphethyl sodium, ethyl lithium, phenyl lithium, tolyl lithium, ethyl potassium, ethyl rubidium, methyl cesium, diethyl beryllium, dimethyl magnesium, diethyl magnesium, diphenyl magnesium, ethyl magnesium chloride, ethyl magnesium hydride, dioctyl magnesium, diethyl calcium, diethyl strontium, diethyl barium, trimethylboron, triethylboron, ethylboron difluoride, sodium tetraethylborate, trimethylaluminum, triethylaluminum, methyldiethylaluminum, tripropylaluminum, dimethylhexylaluminum, methylethyloctylaluminum, triisooctylaluminum, diethylaluminum hydride, methylaluminum dihydride, triisobutylaluminum, diisobutylaluminum hydride, octylaluminum dihydride, sodium aluminum tetraethyl, lithium aluminum tetraethyl, potassium aluminum triethyl hydride, sodium aluminum tetrabutyl, potassium aluminum dioctyl dihydride, dimethylaluminum chloride, ethyl aluminum dichloride, ethylaluminum sesquichloride, trimethylgallium, triethylgallium, methyldiethylgallium, tripropylgallium, trioctylgallium, triisobutylgallium, trimethylindium, triethylindium, tripropylindium, triisobutylindium, triphenylaluminum, sodium aluminum diethyl acetylide, cyclohexyldiethylaluminum, tribenzyl aluminum, triethyl thallium, triphenyl thallium, and the like.

For practical purposes and best results, the alkylaluminum compounds are preferably employed. These compounds are more stable, more readily available and are of higher selectivity. Preferably, each alkyl group therein will contain from 1 up to and including about 8 carbon atoms.

In general, the process is readily performed by placing the molybdenum or tungsten salt, the reducing metal, the organometallic compound and the carbon monoxide into a reaction vessel in a suitable inert atmosphere and, if desired, in the presence of an essentially inert liquid medium. The carbon monoxide is generally pressurized into the reactor. The reaction mixture is likewise usually agitated to provide adequate contact. In most instances the simultaneous reaction of these materials will take place at room temperature although heating is preferred to effect greater reaction rates. At the completion of the reaction, the product is recovered in a conventional manner such as distillation, sublimation, or separation of by-products leaving the product in the liquid medium, when employed, which can then be recovered by concentration and filtration. Alternatively, it is frequently desired to feed the reducing metal to the reaction mixture periodically or continuously during the reaction period.

The process of this invention will be more fully understood by reference to the following examples. In all examples, parts and yields are by weight.

*Example I*

To a reactor equipped with external heating means, internal agitation, means for maintaining pressure, and means for admitting and discharging reactants and products, is added 0.05 mole of molybdenum trichloride, 0.25 atom of powdered aluminum, and 0.0025 mole of triethylaluminum in a large excess of tetrahydrofuran under an inert atmosphere of nitrogen. The reactor is then pressurized with 2500 p.s.i.g. of carbon monoxide and heated with continuous agitation to 120° C. These conditions are maintained for a period of four hours. At the end of this period, after cooling to room temperature, the gases in the reactor are vented to the atmosphere and the mixture is quenched with water and dilute hydrochloric acid. The mixture is then extracted with diethyl ether, and the ether layer is then separated and dried. This dry layer is then subjected to distillation to concentrate the product. In this manner molybdenum hexacarbonyl is obtained in high yield.

Similar results are obtained when the above example is repeated while employing a carbon monoxide pressure of 500 p.s.i.g. with a reaction period of ten hours.

*Example II*

Molybdenum tetra-acetate is reacted in accordance with the procedure of Example I with carbon monoxide (3000 p.s.i.g.) in the presence of zinc dust. The zinc is employed in a four-molar equivalent excess and is previously treated with triethyl aluminum. The reaction is conducted in ethyl ether solvent at a temperature of 25° C. After 20 hours, the chromium hexacarbonyl is recovered by steam distillation. A good yield of chromium hexacarbonyl is obtained.

*Example III*

Tungsten dichloride (0.05 mole) is reacted with carbon monoxide in the presence of metallic aluminum (0.15 atom) and catalytic quantities of triethyl aluminum (0.0025 mole). The aluminum is employed in excess, 3.3 gram atoms of aluminum per mole of the tungsten chloride. The carbon monoxide pressure (3000 p.s.i.g.) is added to the reactor and the reaction heated to 125° C. for 20 hours. Diethyl ether is again employed as the solvent. The tungsten hexacarbonyl is recovered by steam distillation.

*Example IV*

Tungsten tetra-acetate (0.01 mole) and powdered aluminum metal (0.33 atom) is added to a reactor along with an excess of diethyl ether. To this mixture is added 0.0025 mole of triethyl aluminum. The reactor is closed and pressurized with 3000 p.s.i.g. carbon monoxide pressure, and heated to a temperature of 25° C. for 20 hours. Excellent conversions of the tungsten acetate to tungsten hexacarbonyl are obtained.

*Example V*

Tungsten penta-chloride (0.3 mole), powdered aluminum metal (0.03 mole) and diethyl aluminum hydride (0.002 mole) are charged to a reactor along with diethylene glycol dimethyl ether solvent and the reactor thereafter pressurized with 1500 p.s.i.g. of carbon monoxide. The reaction mixture is heated to 125° C. for four hours to produce a good yield of tungsten hexacarbonyl.

*Example VI*

Molybdenum dipropionate (0.5 mole) is reacted with carbon monoxide (5000 p.s.i.g.) in the presence of powdered magnesium (0.10 atom) which is wetted with 0.002 mole of triisobutyl aluminum and an excess of isopropyl ether. The reaction is conducted at a temperature of 150° C. for six hours giving an excellent yield of molybdenum hexacarbonyl.

*Example VII*

Molybdenum penta-chloride (0.1 mole) is reacted with carbon monoxide (1000 p.s.i.g.) in m-xylene while continuously feeding a sodium dispersion in the m-xylene containing catalytic quantities of phenyl sodium over a period of two hours. The total quantity of sodium fed to the reaction is 0.2 atom, which contains 0.005 mole of the phenyl sodium. The molybdenum hexacarbonyl is recovered by steam distillation in good yields.

*Example VIII*

Molybdenum fluoride (0.03 mole), zinc dust (0.18 mole equivalent), diethyl zinc (0.003 mole) and an excess of n-heptane are charged to the reactor and the reactor thereafter pressurized with 3000 p.s.i.g. carbon monoxide pressure. The reaction mixture is heated for 20 hours at 150° C. while continuously stirring the reaction mixture. The molybdenum hexacarbonyl is steam distilled from the reaction mixture and recovered in excellent yield.

*Example IX*

Molybdenum tri-sulfide (0.02 mole) is reacted in diethylene glycol dimethyl ether solvent with 0.6 equivalent of aluminum, 0.002 mole of diethyl aluminum chloride and 5000 p.s.i.g. of carbon monoxide pressure. The reaction conducted at a temperature of 180° C. for 20 hours giving an excellent yield of the desired molybdenum hexacarbonyl.

Example X

Molybdenum dibromide (0.2 mole) is reacted with carbon monoxide at a pressure of 5000 p.s.i.g. The reaction mixture contains 0.6 equivalent of lithium and 0.002 mole of phenyl lithium. The reaction is continued in the presence of isooctane solvent at a temperature of 125° C. The reaction is completed after about ten hours, giving an excellent yield of molybdenum hexacarbonyl.

Example XI

Example I is repeated except that the reaction is conducted in diethylene glycol dimethyl ether solvent at a temperature of 180° C. Similar results are obtained.

Example XII

Molybdenum methoxide is reacted in anisole solvent with carbon monoxide (3000 p.s.i.g.) in the presence of zinc dust and triethyl aluminum. The zinc dust is employed in a concentration of 5 atoms per mole of molybdenum salt. The reaction is conducted at 160° C. and gives an excellent yield of molybdenum hexacarbonyl in about 20 hours.

For the organometallic compounds employed in the above examples one can substitute dimethylaluminum hydride, tribenzylaluminum, tricyclohexylindium, ethylaluminum sesquichloride, diethylaluminum bromide, triethyl gallium, triphenyl gallium, boron, or indium, trimethylindium and the like and obtain similar results.

The temperature at which the reaction is conducted is not critical and generally temperatures between 0 to about 200° C. are employed. In general, the higher the temperature the faster the reaction rate. Accordingly, for such purposes it is preferred to operate at temperatures ranging from 75 to 175° C., depending upon the reactants employed. Likewise, the pressure can be varied over a wide range from superatmospheric to subatmospheric pressures. Ordinarily, since the carbon monoxide is a gas, pressures above atmospheric are employed. A preferred range is between 500 to 4000 p.s.i. in order to obtain optimum results.

The time of reaction will likewise depend somewhat upon the other conditions under which the reaction is conducted although times between about 1 minute to 20 hours are generally quite adequate. In order to minimize side effects it is preferred to conduct the reaction for a period of from 5 minutes to 6 hours.

The proportions of the reactants can likewise be varied and generally are based upon the metal salt. In this connection between about 1 gram atom to 6 gram atoms and higher of the reducing metal are employed per gram mole of the metal salt. However, as the temperature is increased the number of gram atoms of metal generally can be decreased. Where excesses of the metal are employed, such excesses may be recovered and reused. The organo metallic compound is employed in catalytic quantities, i.e. usually from about 1–15 weight percent of the reducing metal. Lower and higher concentrations can be used. However, at lower concentrations, the beneficial results of the catalysts are diminished whereas, at higher concentration, no proportionate improvement is obtained. The carbon monoxide is generally employed in stoichiometric amounts, although excesses can be beneficially employed.

While the above examples indicate that an organic diluent is employed, it is to be understood that such are not essential. In general, when such are employed they should be essentially inert to the reactants. Furthermore, it is desirable, but not necessary, that they exhibit solubility for one or all of the reactants. Among such organic diluents which can be employed are included the hydrocarbons, ethers and amines. Among the hydrocarbons included are, for example, nonanes, octadecanes, hexanes, toluene, benzene, xylene, mesitylene and mixed hydrocarbons such as gasoline, diesel oil and the like petroleum fractions. Among the ethers employable are included for example the non-aromatics, aromatics and polyethers including, for example, di-sec-butyl ether, di-n-heptyl ether, di-isopropyl ether, ethylisoamyl ether, methylphenyl ether (anisole), p-tolyl ether, ethylphenyl ether, tetraethylene glycol dimethyl ether, and the dimethyl, diethyl, and di-n-butyl ethers of diethylene glycol. Among the amines which are employable are included dimethyl amine, diethyl amine, dioctyl amine, diphenyl amine, dicyclohexyl amine, methylethyl amine, p-methyl pyridine, o-methyl pyridine, 2,6-dimethylpyridine, isoquinoline, trimethyl amine, triethyl amine, tributyl amine, tricyclohexyl amine and the like.

The coordinating solvents, especially the ethers, are particularly preferred since these materials exhibit a reaction promoting effect.

The process provides products which are of considerable use. These products can be, for example, subjected to high temperatures, thereby providing decomposition to obtain molybdenum or tungsten in finely divided form. These compounds can be employed in vapor phase to plate metals and other surfaces with molybdenum and/or tungsten coatings. Another particular use for the compounds produced according to the process of this invention is as additives to fuels, especially for internal combustion engines and the like. For example, when sufficient molybdenum pentacarbonyl is added to commercial gasoline to obtain compositions containing 1 gram of molybdenum per gallon, the octane number of the gasoline is greatly increased. The products are also useful as chemical intermediates in preparing organometallic compounds. These and other uses will be evident to those skilled in the art.

Having thus described the process of this invention it is not intended that it be limited except as set forth in the following claims.

I claim:

1. The process for the manufacture of metal hexacarbonyls which comprises reacting a salt of a metal selected from the group consisting of molybdenum and tungsten, carbon monoxide and a reducing metal selected from the group consisting of metals of groups I-A, II and III-A of the periodic chart of the elements in contact with catalytic quantities of an organometallic compound of said reducing metals having organo groups selected from the group consisting of alkyl and aryl groups at a temperature of from about 0–200° C. and at a pressure of from above atmospheric to about 4,000 p.s.i., said organometallic compound having a metal atom bonded directly to a carbon of the organo group.

2. The process of claim 1 wherein the organometallic compound is an aluminum compound.

3. The process of claim 2 wherein the metal is aluminum.

4. The process of claim 1 wherein the metal is sodium.

5. The process of claim 1 wherein the organo group of the organometallic compound is an alkyl group containing from 1 to 8 carbon atoms.

6. The process of claim 1 wherein the metal is in finely divided form, the organometallic compound is present in a concentration of from 1 to 15 weight percent of said metal and the reaction is carried out in an inert liquid medium.

References Cited in the file of this patent
UNITED STATES PATENTS 2,739,169   Hagemeyer _____ Mar. 20, 1956